US006863611B1

United States Patent
Morrow et al.

(10) Patent No.: US 6,863,611 B1
(45) Date of Patent: Mar. 8, 2005

(54) TWO WIRE EXCHANGE SYSTEM

(75) Inventors: James Morrow, Sparks, NV (US); Erhard Rathsack, Reno, NV (US)

(73) Assignee: Bally Gaming, Inc., Las Vegas, NV (US)

(*) Notice: Subject to any disclaimer, the term of this patent is extended or adjusted under 35 U.S.C. 154(b) by 61 days.

(21) Appl. No.: 09/967,573

(22) Filed: Sep. 28, 2001

(51) Int. Cl.[7] ............................ A63F 13/00; A63F 9/24
(52) U.S. Cl. .................... 463/42; 463/40; 463/41
(58) Field of Search ........................... 463/16–43, 1–9; 700/92; 273/143 R, 138.1, 138.2

(56) References Cited

U.S. PATENT DOCUMENTS

| | | | |
|---|---|---|---|
| 4,283,709 A | | 8/1981 | Lucero et al. |
| 5,396,225 A | | 3/1995 | Okada et al. |
| 5,429,361 A | | 7/1995 | Raven et al. |
| 5,580,309 A | | 12/1996 | Piechowiak et al. |
| 5,667,440 A | * | 9/1997 | Sasaki et al. ................. 463/29 |
| 5,752,882 A | | 5/1998 | Acres et al. |
| 5,779,545 A | | 7/1998 | Berg et al. |
| 5,836,817 A | | 11/1998 | Acres et al. |
| 5,842,921 A | | 12/1998 | Mindes et al. |
| 5,902,983 A | | 5/1999 | Crevelt et al. |
| 5,919,091 A | | 7/1999 | Bell et al. |
| 6,012,982 A | | 1/2000 | Piechowiak et al. |
| 6,089,979 A | | 7/2000 | Klein |
| 6,102,799 A | | 8/2000 | Stupak |
| 6,152,824 A | | 11/2000 | Rothschild et al. |
| 6,165,072 A | * | 12/2000 | Davis et al. ................... 463/29 |
| RE37,414 E | * | 10/2001 | Harlick ......................... 463/42 |
| 6,315,668 B1 | * | 11/2001 | Metke et al. .................. 463/42 |
| 6,346,047 B1 | * | 2/2002 | Sobota et al. ................. 463/39 |
| 6,383,076 B1 | * | 5/2002 | Tiedeken ....................... 463/40 |
| 6,443,839 B2 | * | 9/2002 | Stockdale et al. ............. 463/16 |
| 6,450,887 B1 | * | 9/2002 | Mir et al. ...................... 463/42 |
| 6,471,591 B1 | * | 10/2002 | Crumby ........................ 463/26 |
| 6,589,119 B1 | * | 7/2003 | Orus et al. .................... 463/42 |

* cited by examiner

*Primary Examiner*—Xuan M. Thai
*Assistant Examiner*—Robert Mendoza
(74) *Attorney, Agent, or Firm*—Brown Raysman Millstein Felder & Steiner LLP

(57) ABSTRACT

A two wire exchange system is disclosed that enables a gaming machine having one communication port to function as a gaming machine having a plurality of communication ports. The two-wire exchange system allows a gaming machine having only a single communication port to connect to two or more system hosts simultaneously. The two wire exchange system is an intelligent multiplexer that communicates using the same protocol as the system hosts to which it is connected. The two-wire exchange system has the ability to respond to a poll from the system host by indicating that the gaming machine is busy, and that the system host should poll the gaming machine again. This is provided to avoid and to prevent data collisions.

20 Claims, 1 Drawing Sheet

TWO WIRE EXCHANGE SYSTEM

FIELD OF THE INVENTION

This invention relates generally to gaming machine systems and, more particularly, to gaming machine systems which include single port gaming machines that are capable of communicating with multiple system hosts simultaneously.

BACKGROUND OF THE INVENTION

In the gaming industry, most gaming machines currently on the market have only one host communication port with which to communicate with a system host. System hosts communicate with gaming machines for a variety of reasons, including by way of example only, and not by way of limitation, tracking player activity, tracking accounting information, and the like. However, it is becoming increasingly desirable to be able to connect a gaming machine to more than one system host, in order to utilize the capabilities of more than one system host, concurrently. Accordingly, gaming machines with only a single host communication port can not connect to more than one system host. Therefore, owners of these single port gaming machines currently must select a single system host that will be connected to the gaming machines at any given time. In this manner, gaming machines with a single host communication port are more limited in their connectivity than gaming machines with multiple host communication ports.

For example, most slot machines today are single port machines that connect to a system host through their single communication port. Typically, this system host tracks player and accounting information, as well as performing other minor related tasks. Additionally, other hosts exist that include capabilities such as ticket printing. A ticket printing system enables a gaming machine to print tickets that a player may exchange for cash instead of dispensing cash directly to the player. Thus, casino owners may desire to connect their gaming machines to both an accounting system host and a ticket printing host. Currently, however, only gaming machines that have at least two communication ports can connect to both an accounting system host and a ticket printing host, simultaneously.

Importantly, gaming machines as currently constructed, are designed as dedicated devices with exactly the number of inputs and outputs required for their particular purpose. Thus, when a second or third communication port is required, an entire new hardware board design must be produced, which can be an expensive and time consuming task. Connectivity devices, such as USB, SCSI, and Firewire, that are used to provide personal computers ("PCs") with an interface to peripherals, (e.g., scanners, printers, CD-ROM drives, and the like) cannot be used to connect gaming machines to system hosts because these devices do not communicate using a protocol that is compatible with that used by gaming machines and hosts. Furthermore, simple splitting and "daisy chaining" techniques, which are used in the PC industry, also can not be used with gaming machine host communication ports.

Thus, today's gaming machines are not like PCs that can be expanded with plug in cards. In contrast, a typical gaming machine has a fixed number of communication ports, each of which is permanently assigned to a specific function, including by way of example only, and not by way of limitation, systems communication, progressive jackpot communication, and perhaps, bill acceptor communication.

Accordingly, when a system host with 'ticket printing' capabilities was developed, most gaming machines did not have the extra serial port needed for connecting to this host. Thus, the purchase of a new multi-port system was required in order to connect the ticket printing host, as well as the existing system host.

Moreover, communication with a system host or ticket printing host is a demanding job for current gaming machine software. Today's gaming machines are design to handle communicating with one system host Accordingly, adding the workload of a second system host for ticket printing capabilities is a daunting task for existing software.

Accordingly, those skilled in the art have long recognized the need for a system that enables a gaming machine having a single host communication port to function as a gaming machine having multiple communication ports, thereby enabling the gaming machine with one communication port to communicate with more than one system host simultaneously. Such as system would allow owners of single port gaming machines to extend the useful life of such machines, and not require these owners to purchase new multi-port machines in order to obtain the benefits of connecting to more than one system: host simultaneously. Further, a gaming machine having the single port could also be connected to a system host and one or more peripheral devices that might also require communication with the gaming machine. The present invention clearly addresses these and other needs.

SUMMARY OF THE INVENTION

Briefly, and in general terms, the present invention provides a system that enables a gaming machine having a single communication port to function as a gaming device having multiple communication ports so that the gaming machine having the one port can communicate with more than one host system simultaneously. Further, the system allows a casino to connect a gaming machine having the one communication port to more than one peripheral device needing to communicate with a host computer.

More particularly, by way of example and not necessarily by way of limitation, the present invention provides a gaming machine system comprising a gaming machine having a communication port and an intelligent conduit, multiplexer, or router that enables the gaming machine to act as if it has multiple communication ports. The conduit, multiplexer or router is a two wire exchange system that communicates using a protocol specific response, i.e., the same protocol that the hosts, to which it is connected, use to communicate. The two wire exchange system controls the timing of when each of the hosts or the peripherals communicate with the gaming machine.

The system hosts communicate with the gaming machine using a series of polls. Each poll lasts for a period of time. However, the period of time in which the gaming machine responds may be longer than that of the poll. In this event, the intelligent conduit, multiplexer or router indicates to the system host that the gaming machine is busy and that the system host should send the poll again. The present invention also provides a multiplexer comprising a two-wire exchange system for use with a gaming machine wherein the two wire exchange system responds to independent polls from a plurality of host systems while arbitrating the polls to prevent data collision.

The present invention further provides a method of enabling a gaming machine having one communication port to function as a gaming machine having two communication ports comprising: multiplexing the communication port via a multiplexer and connecting a plurality of hosts to the multiplexer, wherein the multiplexer communicates with the plurality of hosts using a protocol-specific response, i.e., the same protocol as the hosts use to communicate. A method of multiplexing data sent by a plurality of hosts to a gaming machine, comprising: responding to independent polls from a plurality of host systems, and arbitrating the polls to prevent data collisions, is also provided.

Finally, the present invention provides a method of multiplexing data sent by a plurality of hosts to a gaming machine, comprising: passing a poll sent by a host to the gaming machine, the poll lasting for a period of time; waiting for the specified period of time that the poll exists for a response from the gaming machine; and sending a response to the host, the response indicating that the gaming machine is busy, and that the host should poll the gaming machine again.

Hence, the present invention satisfies the need for a system that enables a gaming machine having a single communication port to function as a gaming device having multiple communication ports so that the gaming machine can communicate simultaneously with more than one host system. It also allows a casino to connect a gaming machine having the one communication port to more than one peripheral device needing to communicate with a host computer.

These and other objects and advantages of the invention will become apparent from the following, more detailed description, when taken in conjunction with the accompanying drawings and illustrative embodiments.

DETAILED DESCRIPTION OF THE PREFERRED EMBODIMENTS

Figure 1:
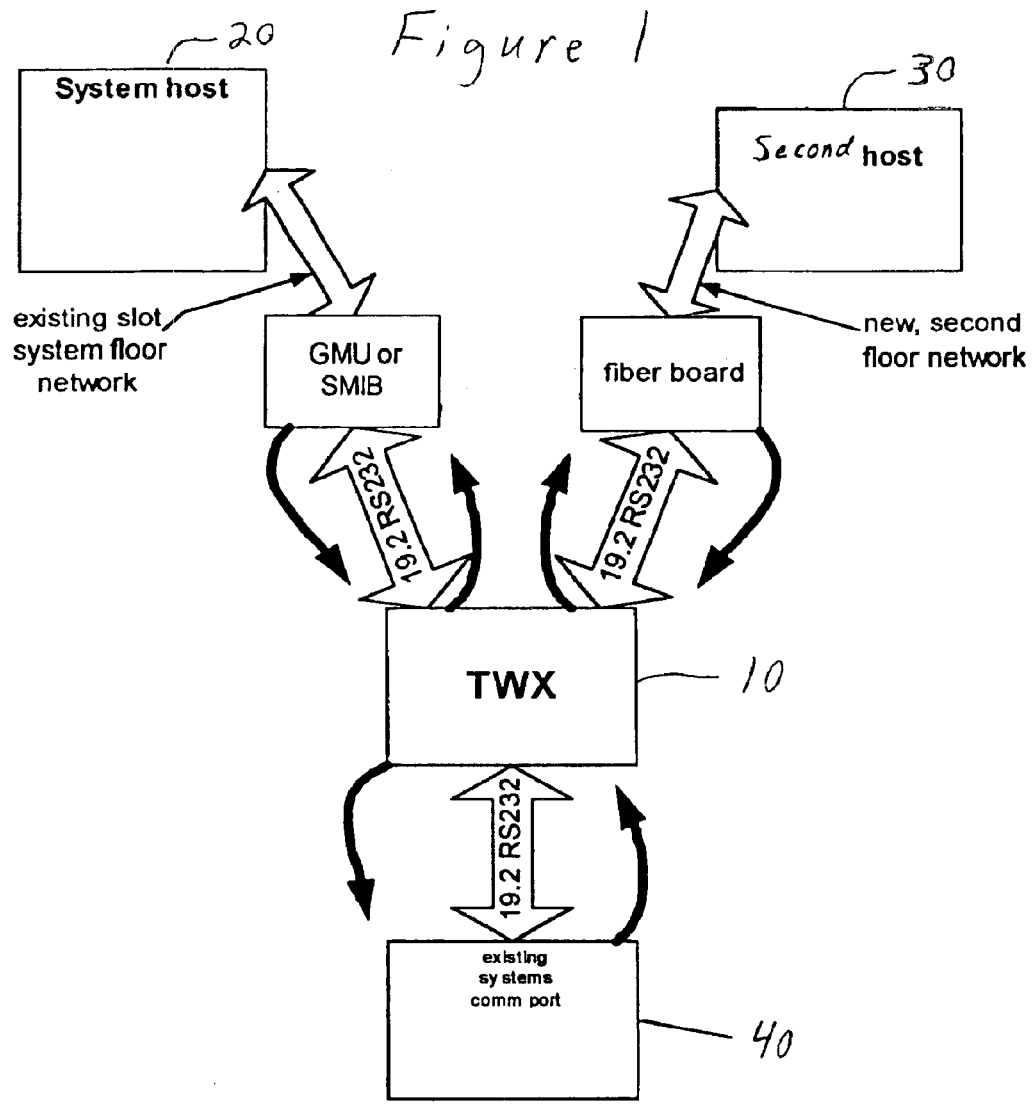
FIG. 1 illustrates a relational diagram of a two wire exchange system, constructed in accordance with the present invention, utilized as an intelligent multiplexer between two host systems and a gaming device.

A preferred embodiment of the two wire exchange system, constructed in accordance with the present invention, is directed towards an intelligent multiplexer that enables a gaming device having a single communication port to communicate with two or more system hosts simultaneously. The two wire exchange system provides protocol-specific responses to long polling by the system hosts that comply with the strict timing response windows required by the adopted protocol. Referring now to the drawings, wherein like reference numerals denote like or corresponding parts throughout the drawings and, more particularly to FIG. 1, there is shown one embodiment of a two wire exchange system 10, constructed in accordance with the present invention.

In a preferred embodiment of the present invention, the two wire exchange system 10 acts as a multiplexing conduit that connects two system hosts 20 and 30 to a slot machine 40 (or other gaming device). The two wire exchange system 10 of the present invention is an intelligent system that responds to polling by the system hosts 20 and 30 using protocol-specific response messages that are native to the protocol being utilized by the system hosts and the gaming device 40. In this way, the two wire exchange system 10 enables a gaming device 40 having only a single communication port 50 to communicate with two (or more) different system hosts 20 and 30, all utilizing the same protocol, simultaneously.

Specifically, the two wire exchange system 10 overcomes challenges in communications timing management related to strict timing response windows and long polling. In a preferred embodiment of the present invention, the two wire exchange system 10 is configured to intelligently communicate in the specific casino accounting protocol that is implemented by the system hosts 20 and 30 and the gaming device 40. Advantageously, the two wire exchange system 10 utilizes off-the shelf hardware and open source software to provide the benefits of reliability, cost minimization, and reusability.

Traditionally, slot machines 40 and other gaming devices have had only one host communication port 50. However, situations arise where it is desirable (or necessary) to connect a gaming device 40 to both a traditional slot system host 20 and to an additional system host 30 (or other peripheral). In a preferred embodiment of the present invention, the two wire exchange system 10 solves this problem by connecting a gaming device 40 to both a traditional slot system host 20 and another system host 30 (e.g., a system host that provides ticket printing capabilities), simultaneously. Proper utilization of the present invention allows a single communication port slot machine 40 to connect to a second system host 30 (or to a peripheral) as well as the original slot system host 20, by positioning the two wire exchange system 10 between the gaming device 40 and the system hosts 20 and 30.

The two wire exchange system 10 responds to independent polling from two system hosts 20 and 30 while arbitrating the polls in order to prevent data collision. The two wire exchange system 10 then passes those requests for information (polls) down to the slot machine 40 and waits for the response to come back from the slot machine. After receiving the response, the two wire exchange system 10 sends the response back to the system host 20 or 30 which made that request.

Moreover, the two system hosts 20 and 30 also attempt to address the gaming device 40. Thus, since the two wire exchange system 10 is positioned between the two system hosts 20 and 30 and the slot machine 40, the system 10 must recognize when a system host is requesting an address for the slot machine, retrieve the address from the slot machine, and pass the address back to the requesting system host.

In a preferred embodiment of the present invention, the two wire exchange system 10 acts only as a conduit (albeit an intelligent conduit) between the two system hosts 20 and 30 and a gaming device 40. Importantly, the two wire exchange system 10 does not initiate any protocol-specific messages or transactions on its own. A system host 20 or 30 must supply the polls and acknowledgements, and the gaming device 40 must supply the exceptions, responses, and chirps. The two wire exchange system 10 then responds to these messages and/or transactions, as appropriate.

In a preferred embodiment of the present invention, the two wire exchange system 10 is used as an intelligent multiplexer to route polling requests between two system hosts 20 and 30 and a slot machine 40 having a single communication port 50. In one preferred embodiment, the first system host 20 is a traditional slot accounting system host, and the additional system host 30 provides ticket printing functionality (e.g., IGT's EZ-pay host system) to a slot machine 40. In this particular embodiment, both system hosts 20 and 30 use a protocol that is designed to transfer casino related accounting information (e.g., the SAS protocol). Moreover, both of these system hosts 20 and 30 poll (i.e., request information from) the slot machine 40 frequently, i.e., as fast as every twenty milliseconds.

As briefly mentioned above, the two wire exchange system 10 of the present invention utilizes a uniquely intelligent form of multiplexing. Traditionally, multiplexing is characterized with respect to communication transmissions and protocols, as a technique for allowing multiple messages or signals to share a communication transmission channel. Two main ways of sharing a channel are time division multiplexing (TDM) and code division multiplexing (CDM). The intelligent multiplexing of the present invention is a form of time division multiplexing. In time division multiplexing, small "time slices" from each input channel are sent in sequence, so that each channel has a proportional amount of time on the output channel. A multiplexer is a device for channeling several data streams into a single communications channel. Typically, for two input channels, a traditional "dumb" multiplexer will simply toggle between time slices for each of the two channels.

However, in the situation contemplated by the present invention, the time required to fetch responses from the long polling, is greater than the time slice allotted for the response window, as dictated by the adopted communication protocol. Accordingly, upon receipt of a long poll from a host, the two wire exchange system 10 immediately responds back to the host with a "poll again later" message (i.e., requests that the host ask for the information again during the host's next time slice). The two wire exchange system 10 then sends the long poll on to the gaming machine 40 which processes the request (taking longer than the allowed response time). The two wire exchange system 10 keeps sending the "poll again later" message until the gaming machine 40 is done responding, thus giving the gaming machine plenty of time to process the poll. Then when the two wire exchange system 10 receives the response from the gaming machine 40 and the long poll is sent again from the system, the system responds to the host with the gaming machine's response to the poll. Thus, in this type of intelligent multiplexing, long poll responses can be obtained by the hosts that can not be processed within a single time slice.

The two wire exchange system 10 differs from other multiplexing devices that are currently utilized, in that the two wire exchange system 10 is intelligent and can communicate in the specific protocol utilized by the gaming device 40 and the system hosts 20 and 30. Thus, the two wire exchange system 10 can intelligently respond to polling from the system hosts 20 and 30 using protocol-specific responses.

In one preferred embodiment, the specific protocol implemented is SAS ("Slot Accounting System"). The SAS protocol is well known and is specifically designed for the communication of information related to casino accounting, security and player tracking. In a other preferred embodiments, the two wire exchange system 10 is configured to be utilized with a gaming device 40 and the system hosts 20 and 30 that all speak an casino accounting related protocol that is different than the SAS protocol. Thus, the two wire exchange system 10 is designed for the intelligent multiplexing of polling requests from two system hosts 20 and 30 to a single gaming device 40, in order to report and transfer information regarding real time winnings and other casino information.

Additionally, the two wire exchange system 10 of the present invention also differs from other multiplexing devices by enabling long poll responses to be made within strict time requirements that would not otherwise be possible using a traditional "dumb" multiplexer. The two wire exchange system 10 of the present invention is configured to perform in this manner because the specific protocol with which the system is designed to function requires a multi-drop of fifty slot machines 40 per second on each line. This timing requirement creates strict response windows to the polling. Therefore, every response window (to the polling) has a timing requirement of 20 milliseconds. Due to this strict time requirement, it is possible for a polling response to carry over to the next response window's time slice, thus resulting in data collisions. In other words, it is possible for a polling response from the first system host 20 and 30 to take longer to complete than the time slice allocated to the first system host's response window, causing the polling response to carry over to the response window dedicated to the other system host 20 or 30. The manner in which the two wire exchange system 10 manages long polls prevents this type of event, i.e., a data collision.

In a preferred embodiment of the present invention, the two wire exchange system 10 implements a unique method of handling long polls. A long poll is a request for information that can not be completed in a single response window. Specifically, the two wire exchange system 10 requires the system host 20 or 30 to long poll twice (or more) for data. During the first long poll by the system host 20 or 30, the two wire exchange system 10 fetches the response from the slot machine 40. During the second (or later) long poll by the system host 20 or 30, the two wire exchange system 10 actually delivers the response (which has already been fetched) back to the system host 20 or 30. Thus, when the two wire exchange system 10 is fetching a response from the slot machine 40 (during the first poll), the exchange system has already told the system host 20 or 30 to poll again later (i.e., perform another poll during the next time slice allocated to that host). In one specific embodiment, this "poll again later" message is performed by a "Game Machine Busy" response (when SAS protocol is utilized). The two wire exchange system 10 sends the "poll again later" message to the host 20 or 30 when the exchange system knows that it will take the gaming device 40 longer than its allocated time slice for the polling response to be processed.

Although a preferred embodiment of the two wire exchange system 10 is configured for communication in a protocol that assumes fifty slot machines 40 are connected to each communication line, in other preferred embodiments the two wire exchange system 10 is configured to function with other protocols that impose other strict timing requirements. Since the slot machines 40 are unable to comply with these strict timing requirements by themselves, the software algorithms in the two wire exchange system 10 enable the slot machines to comply with the timing requirements (for responses to long polling) within the time slices dictated by the adopted protocol. Maintenance of the time slice allocated for the communication response window of each slot machine 40 is crucial to preventing data collisions. It is important to note that the slot machine 40 and the system hosts 20 and 30 all respond at different timing rates.

In a preferred embodiment of the present invention, the software in the two wire exchange system 10 is finite state machine (FSM) software that divides or manages the connection of a gaming device 40 with the connections of two (or more) system hosts 20 and 30. (Finite state machine software stores a status at a given time, and then operates on input to change the status and/or to cause an action or output to take place for a given status change.). The two system hosts 20 and 30 have no knowledge of the other and the FSM software uses the specific protocol to keep each host running smoothly. In a preferred embodiment of the present invention, the two wire exchange system 10 makes extensive use of the SAS protocol-specific "Gaming Machine Busy" response to ensure that long polling responses do not carry over to a time slice that is dedicated to the other host, thus facilitating alternating access between the two system hosts 20 and 30 and the gaming device 40.

In a preferred embodiment of the present invention, the two system hosts 20 and 30 request information from the gaming device 40 (through the two wire exchange system 10) as often as every twenty milliseconds. Thus, there a lot of "chirps," i.e. where a system host 20 or 30 requests information from the gaming device 40, and the gaming device responds that there is no new information. However, when there is new information to report in response to a poll, this response often takes the gaming device 40 longer than twenty milliseconds to process. In this situation, the two wire exchange system 10 responds to the system host 20 or 30 by asking the host to poll again;later (when using the SAS protocol, the "Game Machine Busy" response is utilized). This response tells the system host 20 or 30 that the gaming device 40 is busy processing the request and that the system host should wait and ask (poll) again in its next allotted time slice. Then, when the system host 20 or 30 asks again, the information (poll response) has already been retrieved and is sent right out to the requesting system host. Thus, by extensive use of a "poll again next time slice" type of message, the two wire exchange system 10 is able to handle polling responses that can not be completed within the time slice allocated for the response window of the polling system host In one preferred embodiment, the two wire exchange system 10 speaks to the current system port 50 of a slot machine 40 using SAS version 5 protocol. The two wire exchange system 10 plays the roll of an intelligent arbitrator or router. Importantly, the two wire exchange system 10 performs this function by using protocol-specific responses to the gaming device 40 and the system hosts 20 and 30. Additionally, the two wire exchange system 10 provides the significant advantage of being compatible with the well known Bally Gaming and Systems S6000, V7000, and EVO platforms. Moreover, the two wire exchange system 10 is often compatible with gaming platforms designed by other game manufacturers, as well.

In one specific preferred embodiment of the present invention, the two wire exchange system 10 uses the RT Linux operating system. The RT Linux operating system takes full advantage of the strict timing requirements of casino accounting system protocols (e.g., the SAS protocol). RT Linux is a hard real-time operating system. Advantageously, RT Linux is open sourced. However, in other preferred embodiments of the present invention, other equivalent hard real-time operating systems also may be utilized.

In one preferred embodiment of the present invention, the code for the two wire exchange system 10 software is written in the "C" programming language. However, in other embodiments of the present invention, other compatible programming languages may be utilized. Preferably, the executable is run as a real-time module that consists of: (1) a UART (Universal Asynchronous Receiver-Transmitter), (2) a message parser, and (3) a FSM. These three components all have hard real-time requirements in the sub-millisecond range. Further, these three components easily handle the three 19,200 baud data channels contemplated in a preferred embodiment of the present invention.

In another aspect of one specific preferred embodiment of the present invention, the hardware of the two wire exchange system 10 is a PC 104 platform running an X86 based MachZ processor and using 64 megabits of memory. The PC 104 platform is built by Tri-M Systems of Canada and has a model number of MZ104. Preferably, the MZ104 device has 32 megabits of RAM and 32 megabits of non-mechanical disk memory. The MZ104 device provides the advantages of: (1) using an Intel-based operating system; (2) having small size dimensions; and (3) providing access to many peripheral devices. However, in other preferred embodiments of the present invention, other hardware systems with equivalent capabilities are utilized.

Additionally, in one specific preferred embodiment of the present invention, the two wire exchange system 10 comes enclosed in a metal box with one power connector and four serial connectors. Preferably, three of the serial connectors are labeled for either a host or a slot. One remaining serial connector is allocated for setup and diagnostics. Moreover, preferably the serial connectors are in a DB9 format, and the serial protocol is RS232. In a preferred embodiment, the power is a walled based power adapter.

In another preferred embodiments of the present invention, the two wire exchange system 10 is configured for use as an intelligent multiplexer that utilizes a different specified protocol, preferably a protocol that has a substantially equivalent functionality to the "poll again later" message (or "Game Machine Busy" response in the SAS protocol). Additionally, in yet another preferred embodiment to the present invention, the two wire exchange system 10 is configured to act as an intelligent multiplexer for more than two system hosts 20 and 30. Moreover, in still another preferred embodiment of the present invention, the two wire exchange system 10 is configured to act as a protocol converter, as well as an intelligent multiplexer. Advantageously, in a the two wire exchange system 10 that also acted as a protocol converter, a gaming device 40 would only needs to know one protocol and exchange system 10 would allow the gaming device 40 to talk to various system hosts that spoke various languages.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A gaing machine system, comprising:
   a gaming machine having a communication port; and
   an intelligent multiplexer that enables the communication port to function as if the communication port were a plurality of ports, and wherein the intelligent multiplexer is in simultaneous communication with a plurality of system hosts.

2. The gaming machine system as recited in claim 1, wherein the plurality of system hosts are connected to the communication port through the multiplexer, the hosts being able to communicate with the multiplexer simultaneously, and wherein the multiplexer controls the timing of when each of the system hosts communicates with the gaming machine using fixed time response windows.

3. The gaming machine system as recited in claim 2, wherein the system hosts communicate with the gaming machine through the intelligent multiplexer using a series of polls, each poll being transmitted from the multiplexer to the gaming machine in accordance with the fixed time response windows, wherein a fetching period is the time requited for the gaming machine to respond to a poll, and wherein the multiplexer is capable of arbitrating the polls even when the fixed time response windows are shorter than the fetching period.

4. The gaming machine system as recited in claim 3, wherein the multiplexer responds to a polling system host during a fetching period that the system host should send the poll again.

5. The gaming machine system as recited in claim 1, wherein the plurality of system hosts are connected to the port through the multiplexer, the hosts being able to communicate with the multiplexer simultaneously, wherein the multiplexer communicates with the system hosts using a protocol specific response.

6. The gaming machine system as recited in claim 5, wherein the multiplexer responds to a polling system host during a fetching period using a protocol specific response.

7. A method of enabling a gaming machine having one communication port to function as a gaming machine having two communication ports, comprising.
multiplexing the communication port via a multiplexer; and
connecting a plurality of hosts to the multiplexer, wherein the multiplexer communicates with the plurality of hosts simultaneously using the same protocol the hosts use to communicate.

8. The method as recited in claim 7, wherein the hosts communicate with the gaming machine through the multiplexer using a series of polls, each poll being transmitted from the multiplexer to the gaming machine in accordance with fixed time response windows, wherein a fetching period is the time required for the gaming machine to respond to a poll, and wherein the multiplexer is capable of arbitrating the polls even when the fixed time response windows are shorter than the fetching period.

9. The method as recited in claim 8, wherein the multiplexer responds to a polling host during a fetching period that the host should send the poll again.

10. The method as recited in claim 7, wherein the protocol is a protocol specific response that utilizes fixed time response windows.

11. The method as recited in claim 10, wherein the multiplexer responds to a polling system host during a fetching period using a protocol specific response.

12. The method as recited in claim 7, wherein the multiplexer is a two wire exchange system.

13. The method as recited in claim 7, wherein the multiplexer controls the timing of when each of the hosts communicates with the gaming machine using fixed time response windows.

14. A multiplexer, comprising:
a two-wire exchange system used by a gaming machine, wherein the two-wire exchange system simultaneously communicates with a plurality of host systems, and responds to independent polls from the host systems while arbitrating the polls to the gaming machine using fixed time response windows, thereby preventing data collision.

15. A method of multiplexing data sent by a plurality of hosts to a gaming machine, comprising:
connecting the gaming machine to the plurality of hosts via an intelligent multiplexer;
maintaining simultaneous communication with the plurality of hosts using the intelligent multiplexer;
responding to independent polls from a plurality of host systems; and
arbitrating the polls to from the intelligent multiplexer to the gaming machine using fixed time response windows, thereby preventing data collision.

16. A method of multiplexing data seat by a plurality of hosts to a gaming machine, comprising:
enabling and maintaining simultaneous communication with the plurality of hosts using the intelligent multiplexer;
passing a poll sent by a host to the gaming machine, the poll lasting for a period of time within a protocol-specific, fixed time response window;
waiting for a fetching period, wherein the fetching period is the period of time that is required for a response to the poll from the gaming machine; and
sending a response to the host when the fetching period is longer than the fixed time response window, the response indicating that the host should poll the gaming machine again.

17. A method of multiplexing polling from a plurality of hosts to a gaming machine using time division multiplexing and a communication protocol that together dictate a response window of a designated time period, and wherein a time period required to fetch a response from a polling request is a fetching time period, the method comprising:
upon receipt of a polling request firm a requesting host, responding back to the requesting host with a message to poll again later;
forwarding the polling request from the requesting host to the gaming machine, wherein the gaming machine processes the polling request;
continuing to send the poll again later message until the gaming machine has processed the response to the polling request when the fetching time period that is longer than the response window; and
responding to the requesting host with the response to the polling request from the gaming machine, upon receipt of the response to the polling request from the gaming machine and receipt of another polling request from the requesting host.

18. A gaming system configured to multiplex polling requests from a plurality of hosts to a gaming machine using time division multiplexing and a communication protocol that together dictate a response window of a designated time period, wherein a time period required to fetch a response from a polling request is a fetching time period, the gaming system comprising:
a gaming machine having a single designated communication port, wherein the gaming machine processes the polling request in a fetching time period; and
an intelligent multiplexer in simultaneous communication with the plurality of hosts that receives polling requests from a requesting host, wherein the intelligent multiplexer responds back to the requesting host with a message to poll again later, forwards the polling request from the requesting host to the gaming machine, continues to send the poll again later message until the gaming machine has processed the response to the polling request when the fetching time period that is longer than the response window, and responds to the requesting host with the response to the polling request from the gaming machine, upon receipt of the response to the polling request from the gaming machine and receipt of another polling request from the requesting host.

19. A gaming system, comprising:

a gaming machine having a single designated communication port;

an intelligent multiplexer that enables the communication port to function as if the communication port were a plurality of communication ports;

a plurality of system hosts connected to the communication port via the multiplexer, the hosts being able to communicate with the multiplexer simultaneously; and a protocol converter, wherein when the gaming machine and the plurality of system hosts utilize different protocols, the protocol converter enables the gaming machine and the plurality of system hosts to communicate with each other;

wherein the system hosts communicate with the gaming machine using a series of polls, each poll being transmitted from the multiplexer to the gaming machine in accordance with fixed time response windows, wherein a fetching period is the time required for the gaming machine to respond to a poll, and wherein the multiplexer is capable of arbitrating the polls even when the fixed time response windows are shorter than the fetching period.

20. A gaming system configured to multiplex polling requests from a plurality of hosts to a gaming machine using time division multiplexing and at least one communication protocol that together dictate a response window of a designated time period, wherein a time period required to fetch a response from a polling request is a fetching time period, the gaming system comprising:

a gaming machine having a single designated communication port, wherein the gaming machine processes the polling request in a fetching time period;

a protocol converter, wherein when the gaming machine and the plurality of system hosts utilize different protocols, the protocol converter enables the gaming machine and the plurality of system hosts to communicate with each other;

an intelligent multiplexer in simultaneous communication with the plurality of hosts that receives polling requests from a requesting host, wherein the intelligent multiplexer responds back to the requesting host with a message to poll again later, forwards the polling request from the requesting host to the gaming machine, continues to send the poll again later message until the gaming machine bas processed the response to the polling request when the fetching time period that is longer than the response window, and responds to the requesting host with the response to the polling request from the mug machine, upon receipt of the response to the polling request from the gaming machine and receipt of another polling request from the requesting host.

* * * * *

UNITED STATES PATENT AND TRADEMARK OFFICE
CERTIFICATE OF CORRECTION

PATENT NO. : 6,863,611 B1
DATED : March 8, 2005
INVENTOR(S) : James Morrow and Erhard Rathsack It is certified that error appears in the above-identified patent and that said Letters Patent is hereby corrected as shown below:

Column 8,
Line 56, delete "gaing" and insert -- gaming --.

Column 9,
Line 9, delete "," requited" and insert -- required --.
Line 29, delete the period "." after "comprising" and insert a colon -- : --.

Column 10,
Line 12, delete "seat" and insert -- sent --.
Line 34, delete "firm" and insert -- from --.

Column 12,
Line 24, delete "bas" and insert -- has --.
Line 28, delete "mug" and insert -- gaming --.

Signed and Sealed this

Seventeenth Day of May, 2005

JON W. DUDAS
*Director of the United States Patent and Trademark Office*